United States Patent
Pistoia et al.

(10) Patent No.: US 8,572,748 B2
(45) Date of Patent: Oct. 29, 2013

(54) LABEL-BASED TAINT ANALYSIS

(75) Inventors: Marco Pistoia, New York (IT); Takaaki Tateishi, Yamato (JP); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/028,237

(22) Filed: Feb. 16, 2011

(65) Prior Publication Data

US 2012/0210432 A1  Aug. 16, 2012

(51) Int. Cl.
 *G06F 12/14* (2006.01)
 *G08B 23/00* (2006.01)
 *G06F 11/00* (2006.01)

(52) U.S. Cl.
 USPC ..................................... 726/25; 707/999.206

(58) Field of Classification Search
 USPC .............................. 726/25; 707/206, 999.206
 See application file for complete search history.

(56) References Cited

U.S. PATENT DOCUMENTS

| | | | |
|---|---|---|---|
| 7,788,235 | B1 | 8/2010 | Yeo |
| 2006/0265438 | A1* | 11/2006 | Shankar et al. ............... 707/206 |
| 2007/0083933 | A1 | 4/2007 | Venkatapathy et al. |
| 2007/0244942 | A1* | 10/2007 | McCamant et al. .......... 707/206 |
| 2009/0113550 | A1* | 4/2009 | Costa et al. ..................... 726/25 |
| 2009/0165135 | A1 | 6/2009 | Lomont et al. |
| 2009/0292941 | A1 | 11/2009 | Ganai et al. |
| 2010/0058475 | A1* | 3/2010 | Thummalapenta et al. .... 726/25 |
| 2011/0126288 | A1* | 5/2011 | Schloegel et al. ............... 726/25 |
| 2011/0173693 | A1* | 7/2011 | Wysopal et al. ................ 726/19 |
| 2011/0197180 | A1* | 8/2011 | Huang et al. .................. 717/126 |

OTHER PUBLICATIONS

Ball, Thomas and Sriram Rajamani. "The SLAM Project: Debugging System Software via Static Analysis", 2002.*
Balzarotti, Davide et al. "Saner: Composing Static and Dynamic Analysis to Validate Sanitization in Web Applications", 2008.*
Havelund, Klaus. "Using Runtime Analysis to Guide Model Checking of Java Programs", 2000.*
Jovanovic, Nenad et al. "Pixy: A Static Analysis Tool for Detecting Web Application Vulnerabilities (Short Paper)", 2006.*
Lam, Monica S. et al. "Securing Web Applications with Static and Dynamic Information Flow Tracking", 2008.*
Visser, Willem et al. "Using Predicate Abstraction to Reduce ObjectOriented Programs for Model Checking", 2000.*
Visser, Willem et al. "Model Checking Programs", 2002.*
V. B. Livshits and M. S. Lam., "Finding security vulnerabilities in java applications with static analysis". In USENIX Security, 2005.
O. Tripp et al., "TAJ: Effective taint analysis of web applications". In PLDI, 2009.
J. Newsome et al., "Dynamic Taint Analysis for Automatic Detection, Analysis, and Signature Generation of Exploits on Commodity Software", Proceedings of the Network and Distributed System Security Symposium (NDSS 2005), 2005.

* cited by examiner

*Primary Examiner* — Michael Simitoski
(74) *Attorney, Agent, or Firm* — Ziv Glazberg

(57) ABSTRACT

A computer-implemented method and apparatus, adapted to receive a computer program, and dynamically analyze the computer program to determine flow of untrusted data with respect to a computer resource associated with the computer program. Based on the flow of untrusted data, the method and apparatus determine an abstraction of the computerized resource, and performing static analysis of the computer program with respect to the abstraction, wherein the static analysis is for identifying whether the computer program is susceptible to one or more possible security vulnerabilities.

21 Claims, 3 Drawing Sheets

LABEL-BASED TAINT ANALYSIS

TECHNICAL FIELD

The present disclosure relates to program characterization in general, and to analyzing program security, in particular.

BACKGROUND

Computerized devices and computer programs control almost every aspect of our life, from writing documents to controlling traffic lights. Many of these devices and programs receive input from the environment, including for example input received from humans, other programs, physical measurements, or any other sources.

Not all of these sources may always be trusted. An execution path may exist within a computer program, from where input is received, also referred to as a source, to where the received information is used, also referred to as a sink. For example, a person may be expected to input a string into an application, wherein the string is then used as a query to another application. A user may enter malicious content, which may cause damage when received by the other application, for example altering a database structure in a forbidden manner, changing system files, directing a browser to an undesired site, or any other, In some embodiments, received information can be processed prior to being received by the sink, by a sanitizer or a validator. A sanitizer is one or more computer instructions which examine the data for security vulnerability, and changes it if required, for example by placing a string between quotes or double quotes. A validator is one or more computer instructions which examine the data to determine whether it may trigger a security vulnerability when reaching a downstream security-sensitive operation, and if so, makes a control-flow judgment that prevents this from happening.

BRIEF SUMMARY

One exemplary embodiment of the disclosed subject matter is a computer-implemented method performed by a computerized device, comprising: receiving a computer program; dynamically analyzing the computer program to determine flow of untrusted data with respect to a computer resource associated with the computer program; based on the flow of untrusted data, determining an abstraction of the computerized resource; and performing static analysis of the computer program with respect to the abstraction, wherein the static analysis is for identifying whether the computer program is susceptible to one or more possible security vulnerabilities.

Another exemplary embodiment of the disclosed subject matter is an apparatus having a processing unit and a storage device, the apparatus comprising: a computer program receiver configured to obtain a computer program; a dynamic analysis component configured to determine flow of untrusted data with respect to a computer resource associated with the computer program; an abstraction determination component operative to determine an abstraction of the computer program, based on the flow of untrusted data; and a static analysis component configured to statically analyze the computer program with respect to the abstraction, wherein the static analysis is operative to determine whether the computer program is susceptible to one or more possible security vulnerabilities.

Yet another exemplary embodiment of the disclosed subject matter is a computer program product comprising: a non-transitory computer readable medium; a first program instruction for receiving a computer program; a second program instruction for dynamically analyzing the computer program to determine flow of untrusted data with respect to a computer resource associated with the computer program; a third program instruction for determining an abstraction of the computerized resource based on the flow of untrusted data; and a fourth program instruction for performing static analysis of the computer program with respect to the abstraction, wherein the static analysis is for identifying whether the computer program is susceptible to one or more possible security vulnerabilities, wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
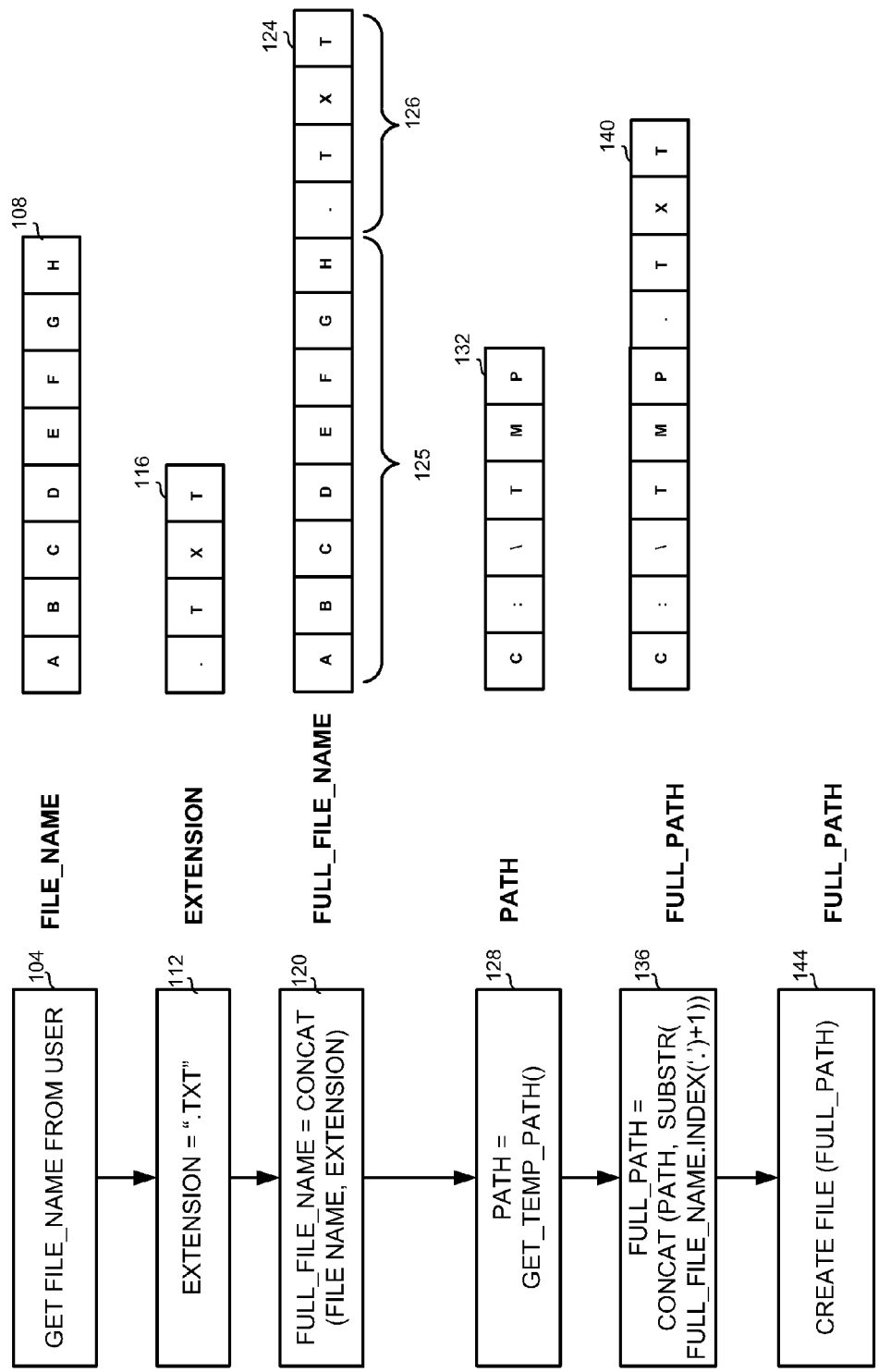
FIG. 1 shows a simplified illustration of exemplary data as processed by some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is verifying that a program is not exposed to a security vulnerability. In some exemplary embodiments, the disclosed subject matter may be utilized to verify that a computer program is safe in the sense that malicious input received by the program cannot be used to cause harm to entities such as but not limited to the underlying computing platform, another computing platform, a program, data, user, user data, or the like. It is also required to identify one or more possible security vulnerabilities of the program, in which received malicious data may cause damage.

Some exemplary embodiments may be performed dynamically by executing the program with additional instructions or commands, e.g., instrumentation code, while other embodiments employ static analysis in which the code is being examined rather than executed with any particular data.

In some analysis methods, security vulnerabilities may be indicated by a label assigned to a memory area associated with a variable, indicating whether the contents of the memory area can be trusted or not, i.e., whether malicious data can or cannot be stored in that location during the program flow.

In some exemplary embodiments, labeling may be performed in dynamic analysis, and therefore be valid in regard to the particular execution. Thus, other executions, perhaps with different data may provide different results and indicate the same areas as trusted, other areas as untrusted, or other differences. The dynamic approach is therefore limited by the number of executions, may not cover all states, and may suffer from false negatives, i.e., undetected vulnerabilities.

In addition, assigning a trusted/untrusted label to each variable may lead to false positive indications. For example, if malicious data is input into a part of a data structure (e.g. a string), but only other parts of the data structure are being accessed or used, then labeling the whole data structure as untrusted may falsely indicate non-existing vulnerability.

In some exemplary embodiments, labeling may be performed in static analysis. The program may be analyzed statically by its structure and possible control flows rather than by specific execution. Static analysis may comprise building a control flow graph (CFG) representing the program, and analyzing the vulnerability of various states within the graph. In some exemplary embodiments, states of possible execution of the program may be represented using the memory state and control location of the program. However, the state-space is exponential in the number of bits being using in the memory and therefore the static analysis may not scale well for real-world program.

One technical solution is to combine dynamic analysis with static analysis in performing analysis for a security vulnerability. The dynamic analysis may be used for identifying through execution of the memory areas which are likely to be trusted or untrusted.

In some exemplary embodiments, instead of retaining the memory image in each execution state, reduced information may be retained, such as for example a label for each variable. Although this may reduce the state-space, false positive indications may occur.

The static analysis is then used for verifying and providing a proof that the states and memory areas identified by the dynamic analysis as trusted are genuine. It will be appreciated that if the dynamic analysis, which is based on exemplary one or more executions of the program, indicates a memory area as untrusted, there is no need to verify that with static analysis, which potentially corresponds to all possible executions of the program, since it cannot be proved that the memory area is trusted in every case.

The dynamic analysis thus enables limiting the number of states spanned and examined by the static analysis, so that the static analysis becomes useful and feasible also for non-trivial programs.

In some exemplary embodiments, dynamic analysis is performed on the program, by executing the program one or more times with instrumentation code. The instrumentation code provides for tracking memory locations used by the program in any of the executions, and determining for specific memory locations whether they are to be trusted or not. Untrusted memory locations may be indicated as "tainted", while trusted areas are indicated "untainted". In some exemplary embodiments, dynamic analysis may be performed on a trace or log generated during execution, wherein the log or trace are processed after the execution ends.

To facilitate analysis in accordance with the disclosed subject matter, input information about one or more computer instructions, relating to whether the instruction can make an associated memory area untrusted. For example, a command related to receiving a character string from a user and storing it in a variable may indicate that the variable is tainted. In some exemplary embodiments, the labeling may be propagated to other memory areas. For example, if a string concatenation command concatenates the contents of two memory areas into a third area, the third area will only be indicated as untainted if both concatenated areas are indicated as untainted.

In some exemplary embodiments, additional input may indicate sink commands which utilize data and are vulnerable to use of untrusted data. For example, issuing an SQL command may be considered a sink command since that use of untrusted data may result in a security breach such as SQL injection.

In some exemplary embodiments, additional input may indicate neutralizing commands such as performing validation of data to insure it can be treated as trusted, sanitizing data to be trusted (e.g., adding escape-characters to strings), or the like.

In some exemplary embodiments, the output of the dynamic analysis takes the form of execution states and a collection of memory areas, each with an associated label. The labels can indicate that an area is tainted or untainted, but can also be more specific, and indicate for example different types of taint, such as SQL taint, cross-site scripting taint, or the like.

An abstraction step can be performed as part of the dynamic analysis, or on top of the output of the dynamic analysis, which identifies execution states and memory areas which are likely invariant, i.e., contiguous areas which are likely to be tainted or untainted as a whole during execution. In some exemplary embodiments, the likely invariants are specific to program locations (e.g., for each execution observed, at a specific program counter, a first area is tainted and a second area is not tainted). The abstraction level may be as fine or coarse as required, and as can be handled by the static analysis. For example an array can be assigned a single tainted/untainted label, or multiple labels. Although the labeled areas may comprise parts of variables within the program, these parts can be related as atomic units, for which no need exists for further fragmentation.

In some exemplary embodiments, the abstraction may determine a set of memory areas to be treated as atomic memory locations. The memory areas may comprise separate fragments of data structures (e.g., a string, an array, a class, or the like). The memory areas may comprise entire data structures (e.g., a string, an array or the like). The abstraction may therefore reduce the state-space that the static analysis processes. The reduction is specifically based on the operation of the program itself. The abstraction may be specifically tailored for the program.

The likely invariants may be identified by comparing the outputs of various dynamic executions and identifying such labels which are characteristic of one or more states, regardless of the actual data stored within the relevant memory areas.

Once the areas which are likely to be tainted or untainted together are identified, i.e., a partitioning is defined, static analysis is performed for the states as identified by the abstraction, e.g., using the partitioning as defined by the abstraction in order to verify that the areas indicated as untainted are indeed so. The dynamic analysis therefore be considered as providing hints to the static analysis about which states are to be tested, thus enabling the static analysis to provide useful results without spanning the whole state space. The dynamic analysis may provide hints as to how to model the concrete memory, such that the partitioning is refined enough to avoid false-positive findings on the one hand but is coarse enough to avoid state-space explosion by the static analysis on the other hand. Note that in some exemplary embodiments, regardless of the quality of the hints provided by the dynamic analysis, the solution computed by the static taint analysis may be sound so long as the transformers defined by the analysis are sound, since the abstraction resulting from the hints is guaranteed to be safe.

One technical effect of utilizing the disclosed subject matter is making the static analysis feasible by limiting the state-space it analyzes. Another technical effect is to detect security vulnerability using taint-analysis on programs. The analysis is performed with respect to specific portions of the data used by the program as defined by the abstraction. The abstraction is specifically tailored to partition data structures into separate fragments based on the taint behavior of the data structures as identified by the dynamic analysis.

Referring now to FIG. 1, showing an exemplary situation in which the labeling resolution changes the trustiness of certain variables. The left hand side of FIG. 1 shows computer instructions, and the right hand side shows the values of variables associated with the instructions, once the instruction has been executed.

Instruction 104 relates to receiving a file name, for example from a user typing or otherwise indicating such name, from a file, through some interface, or the like. The associated file_name variable 108 is assigned the value of "ABCDEFGH", and is indicated as tainted, since malicious data can be introduced.

Instruction 112 sets a predetermined string, ".TXT", into an extension variable 116, which makes extension variable 116 untainted.

Instruction 120 concatenates file_name variable 108 and extension variable 116 into a full_file_name variable 124. When a single label is used for each variable, the concatenating of file_name variable 108 which is tainted, makes full_file_name variable 124 tainted as well. However, if the analysis uses higher resolution, in which multiple labels can be assigned to each variable or area, then part 125 of full_file_name variable 124, which includes the characters until the dot character ".", would be indicated as tainted, while the other part 126, including and following the dot character "." would be indicated as untainted.

Instruction 128 gets a path from a source not controlled by a user (i.e., not a data source) into a path variable 132, path variable 132 gets for example the value of "CATMP" and is labeled as untainted.

Instruction 136 sets the value of a full_path variable 140 to be the concatenation of path variable 132, and the part of full_file_name variable 124 including and following the dot character ".", i.e., the file extension.

If a single label is assigned to each variable, full_file_name variable 124 will be assigned a tainted label, since part of it is taken from a tainted variable. However, if the analysis is of higher resolution, full_path variable 140 as being the concatenation of two untainted areas, will be labeled untainted as well.

Instruction 144 creates a file whose name is full_path variable 140. Since creating a file may be considered as a sink command, then if a variable with a tainted label is used for creating the file, it can be deduced that the program is susceptible to a potential security vulnerability.

It will be appreciated that although FIG. 1 demonstrates a character string, the method and apparatus demonstrated below are equally effective for handling other data structures, such as arrays, data records, or the like.

It will be noted that based on the analysis of the single execution, full_file_name variable 124 may be represented by more than one label. In some exemplary embodiments, variable 124 may be represented by two variables, one for a suffix containing the last four characters and one for the prefix. The size of a fragment may be either constant (e.g., 4 characters of the suffix) or variable (e.g., the prefix followed by the suffix). In some exemplary embodiments, an abstraction may be determined so as to partition the variable 124 into two sections, the prefix (e.g. "ABCDEFGH"), and the extension (e.g. ".TXT").

Figure 2:
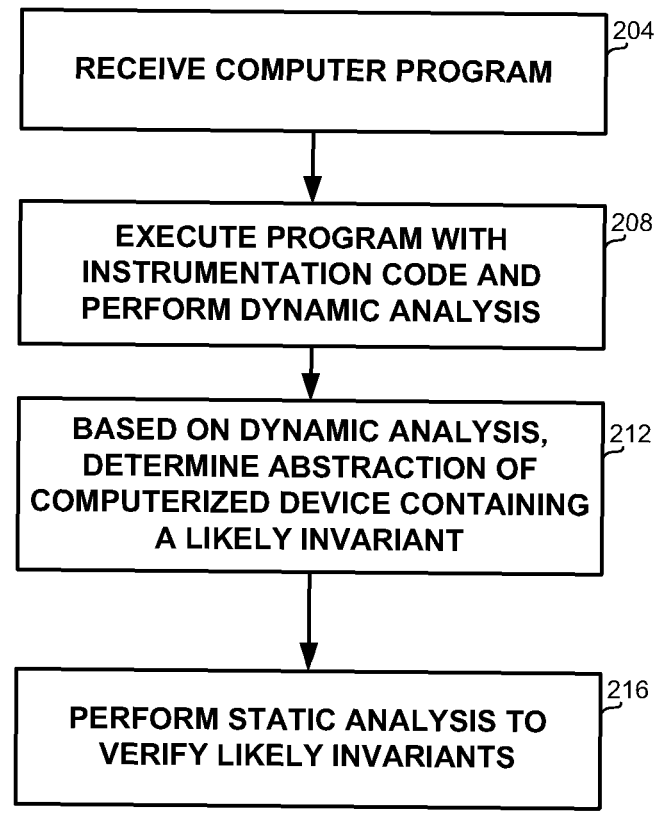
FIG. 2 shows a flowchart diagram of a method, in accordance with some exemplary embodiments of the disclosed subject matter.

Referring now to FIG. 2, showing a flowchart of steps in a method for label-based taint analysis.

On step 204 a computer program is received by a program or system adapted for performing label-based taint analysis. The computer program can be in a form of source code which should be compiled, source code which is interpreted, machine instructions, combination thereof, or the like.

In some exemplary embodiments, security specification may be obtained. The security specification may comprise indications for specific commands whether and how the commands and their parameters are related to security. The indications may identify data source commands, data sink commands, modifier commands, also referred in the art as downgrader commands, for neutralizing untrusted data or the like.

On step 208, the code is dynamically analyzed by execution, for determining flow of untrusted data with respect to computer resources such as memory, which are associated with the computer program. The code can be analyzed, for example, by being executed with instrumentation code that assigns labels to memory locations such as variables, each label may indicate whether an area is tainted or untainted.

The instrumentation code may comprise statements interleaved into the program code for creating and propagating labels at run-time. When the code is executed on actual data, such as when it is compiled if required and executed, or executed by an interpreter, the code instrumentation can be accomplished by extending the compiler or interpreter to interleave statements into the code. Instrumentation may be performed on a binary representation of the program by assembly manipulation of the binary representation. In a virtual-execution environment, code instrumentation can be carried out by the class loader, when classes are loaded into memory.

The instrumentation code may label areas as tainted or untainted depending on the security specification. The instrumentation code may propagate labeling based on executed commands and their parameters.

The labeling resolution may depend on the required resolution and can be set for example through a preferences file, environment variables, registry entries or the like.

It will be appreciated that the labeling is not limited to a single type of taint. Rather, each memory area can be indicated as tainted for a particular issue and untainted for another. Even further, the division into tainted and untainted is not necessarily uniform for all purposes. For example, certain area can be labeled as tainted for SQL-related purposes, and untainted for cross site scripting issues, while another area can be labeled as tainted for both types of purposes. In some exemplary embodiments, each neutralizing command may be associated with a specific type of labeling.

On step 212, based on the dynamic analysis or as part thereof, an abstraction of a computerized device such as a memory device is determined The abstraction may be based on likely invariants determined in view of the dynamic analysis. The likely invariants may be invariants that are held for the sample of executions that were analyzed by the dynamic analysis. In some exemplary embodiments, the likely invariant may indicate at a certain program location memory areas which are tainted or untainted. The likely invariants may be identified using memory space fragmentation in order to determine fragments of the memory space, wherein each fragment is abstracted to be referred as an atomic unit, i.e., its sub-areas are simultaneously tainted or untainted in all states.

As variables are modified during execution of the program, fragmentation may be determined based on likely invariants throughout the program. For example, with respect to a string S having at most ten characters, there may be at a first program location a likely invariant that holds that S may is labeled as "U[10]" (i.e., ten untainted characters). At a second program location there may be a likely invariant holding S is labeled as "T[3]U[7]" (i.e., three tainted characters followed by seven untainted characters). At a third program location there may be a likely invariant holding S is labeled as "U[6]T[4]" (i.e., six untainted characters followed by four tainted characters). Based on these likely invariants, S may be fragmented into three sections: 3 characters, 3 characters and four characters.

In some exemplary embodiments, the likely invariant may provide data of different resolution such as the data itself, (e.g., at a program location, S is always the constant ".txt"; at a program location the fourth character from the end of the string is always ".", or the like), more detailed labeling, or the like. However, regardless of the coverage of the dynamic analysis results and the abstraction quality, the static analysis will provide safe results, e.g. may indicate a secure situation as insecure, but not the other way around. As the coverage of the dynamic analysis and the abstraction quality increase, so do the refinement level of the static analysis.

In the example of FIG. 1, if a single label is assigned to each variable, then the abstraction can indicate the following likely invariants after the execution of command 136: file_name variable 108, full_file_name variable 124 and full_path variable 140 are tainted, while extension variable 116 and path variable 132 are untainted. As the variables in this example are not modified, the program location is of little significance and is omitted for clarity.

If, however, finer resolution is employed in the dynamic analysis, the abstraction may indicate the following likely invariants: file_name variable 108 is tainted, extension variable 116 and path variable 132 are untainted, part 125 of full_file_name variable 124 is tainted, part 126 of full_file_name variable 124 is untainted, and full_path variable 140 is thus untainted.

In some exemplary embodiments, since the abstraction uses the output of the dynamic analysis, the resolution of the abstraction is at most the resolution of the dynamic analysis. However, a more coarse resolution may be determined in the abstraction than that utilized by the dynamic analysis. In some exemplary embodiments, the resolution of the abstraction may vary with respect to different variables, as with the aforementioned example.

On step 216, static analysis is used to verify the likely invariants as supplied by abstraction step 212.

Static analysis in general may be associated with Control Flow Graph (CFG), which can be represented as a set of execution states at which the program can be, and transition relations between states of the set. Each execution state may be associated with particular memory contents. In some exemplary embodiments, the CFG may represent the entire program. The CFG may be an interprocedural CFG (iCFG).

Based on the abstraction, a reduction in the size of the state set may be achieved, thus making the static analysis feasible also for programs that have a large state set.

In some exemplary embodiments, the static analysis may identify in particular execution paths in which a data is received from a source and flows to a sink, without a modifier. In some exemplary embodiments, a source is a command that may receive malicious information from an external source, such as a user, a user-controlled file, a communication channel, an environment or the like. In some exemplary embodiments, a sink is a command that may be vulnerable to usage of unsecured data. The sink may be a command that may perform malicious operation using certain input. For example the sink may cause damage, such as erase a system file, corrupt data, deleting data, cross site scripting or the like. In general, a sink is a security-sensitive operation. A sink may expose sensitive information, and thus violate confidentiality. In some exemplary embodiments, a modifier is a command that neutralizes the danger within the data received from the source. One type of modifier relates to a sanitizer, which may change the data, for example by placing it between quotes. Another type is a validator which validates that the data cannot cause harm. In case the data is malicious, the data validator may be utilized to change the control flow, for example by branching, if the data seems to be unsafe. Additional types of modifiers may be obvious to a person of ordinary skill in the In some exemplary embodiments, the result of the static analysis may be a proof that a program is safe. Alternatively, a counter-example which exhibits a control path in which security vulnerability may be exploited, can be produced. In the example of FIG. 1, if the resolution is indeed higher than one label per variable and indicates that full_file_name variable 124 is partly tainted and partly untainted, and thus full_path variable 144 is untainted, such proof may show that command 144 which creates the file is not affected by user-entered data. If, however, the resolution is low, then full_file_name variable 124 and full_path variable 144 will be indicated as tainted, so that instruction 104 is a source, instruction 144 is a sink, and there are no modifiers inbetween. In such case, either the static analysis will not be invoked at all, or if invoked will not be able to provide a security proof, and a conservative false answer will be provided.

In some exemplary embodiments, in the absence of a path in the CFG that obtains data from a source and uses the data in a sink without first neutralizing the data by a modifier, then the program may be deemed as proven to be without a security vulnerability in accordance with the disclosed subject matter.

Thus, the static analysis operates on a reduced state space, which comprises states reported by the dynamic analysis, the reduction making static analysis feasible. The static analysis provides proof for hypotheses presented by the dynamic analysis.

In some exemplary embodiments, the static analysis may produce a false positive indication in case the abstraction is of a too high resolution. In some exemplary embodiments, based on the erroneous counter-example, the abstraction may be refined. The refinement may be performed manually, automatically, or in combination thereof.

Figure 3:
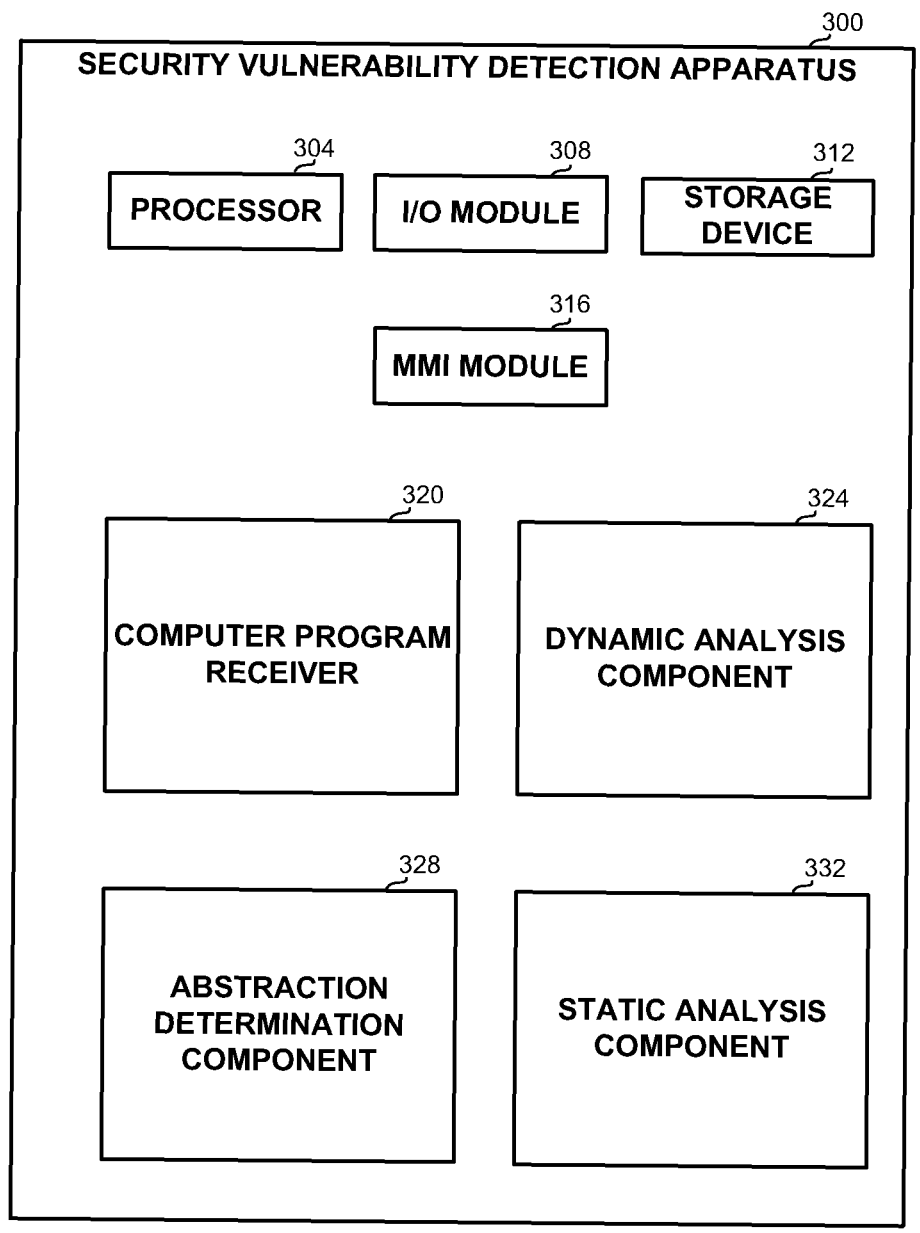
FIG. 3 shows a block diagram of an apparatus, in accordance with some exemplary embodiments of the disclosed subject matter.

Referring now to FIG. 3 showing a computerized apparatus 300 in accordance with some exemplary embodiments of the disclosed subject matter, the apparatus operative for determining security vulnerabilities of a computer program.

In some exemplary embodiments, apparatus 300 may comprise a processor 304. Processor 304 may be a Central Processing Unit (CPU), a microprocessor, an electronic circuit, an Integrated Circuit (IC) or the like. Alternatively, apparatus 300 can be implemented as firmware ported for a specific processor such as digital signal processor (DSP) or microcontrollers, or can be implemented as hardware or configurable hardware such as field programmable gate array (FPGA) or application specific integrated circuit (ASIC). Processor 304 may be utilized to perform computations required by apparatus 300 or any of it subcomponents.

In some exemplary embodiments of the disclosed subject matter, apparatus 300 may comprise an Input/Output (I/O) module 308. I/O module 308 may be utilized to provide output to and receive input from a user, for example receiving specific user commands or parameters related to the apparatus, providing output for viewing security vulnerabilities or associated labels, or the like.

In some exemplary embodiments, apparatus 300 may comprise a storage device 312. Storage device 312 may be persistent or volatile. For example, storage device 312, a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause processor 304 to perform acts associated with any of the subcomponents of method 200 or apparatus 300, for example storing the tested computer program or its vulnerabilities.

A user (not shown) may utilize a man-machine interface (MMI) device 316 such as a terminal, a display, a keyboard, an input device or the like to interact with the system, to invoke the system and to receive results. It will however be appreciated that the system can operate without human operation.

The components detailed below may be implemented as one or more sets of interrelated computer instructions, executed for example by processor 304 or by another processor. The components may be arranged as one or more executables, dynamic libraries, static libraries, methods, functions, services, or the like, programmed in any programming language and under any computing environment.

Apparatus 300 may comprise a computer program receiver 320, for receiving a computer program. The computer program can be received in source code, machine code, executable, or the like.

The apparatus comprises dynamic analysis component 324, which executes the computer program one or more times, with instrumentation code. The computer program may be compiled and executed, interpreted, virtually executed, or the like. Dynamic analysis component 324 is adapted to analyze the computer program and determine flow of untrusted data with respect to computer resources such as memory, associated with the computer program.

Dynamic analysis component 324 creates and propagates states of the computer program, associated with taint-related labels. The labels indicate for a computerized device, such as computerized memory whether segments thereof are tainted or untainted, i.e., whether values input into these areas may be used for harming a computerized device, a program, data, or the like. Dynamic analysis component 308 may be associated with an instrumentation module for introducing instrumentation code into the computer program and generating the labels.

Abstraction determination component 328 generates likely invariants, based on the output of dynamic analysis component 324. The likely invariants are resources such as contiguous memory areas which are tainted or untainted at a particular state. For generating the likely invariants, abstraction determination component 328 may be operatively coupled to a memory space fragmentor operative to determine fragments of a memory spaces accessed by the computer program, wherein each fragment is abstracted to be referred as an atomic unit.

Static analysis component 332 receives the abstraction consisting of the states and the labels, and constructs a graph representing the computer program. Static analysis component 332 is operatively coupled to a control flow graph (CFG) builder (not shown) for building the graph. A path in the graph may serve as a counter-example exemplifying a security vulnerability of the program.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
    receiving a computer program configured to use a plurality of memory locations;
    dynamically analyzing the computer program to determine flow of untrusted data during execution of the computer program, wherein the flow of untrusted data is determined by tracking propagation of untrusted data between memory locations;
    identifying at least one likely invariant of the computer program relating to trusted data or untrusted data being retained at a portion of the plurality of memory locations;
    at least based on the at least one likely invariant, determining an abstraction of the computer program useful for statically analyzing whether the computer program is susceptible to at least one possible security vulnerability; and
    performing static analysis of the abstraction, wherein the static analysis is for identifying whether the computer program is susceptible to at least one possible security vulnerability.

2. The computer-implemented method of claim 1, wherein the flow of untrusted data is indicated by a label for the memory locations, the label relating to the least one possible security vulnerability.

3. The computer-implemented method of claim 1, wherein the likely invariant is associated with a program location and with the flow of untrusted data.

4. The computer-implemented method of claim 1, wherein the computer program is representable by a set of states and a transition relation between states of the set of states, wherein the abstraction reduces a size of the set of states.

5. The computer-implemented method of claim 1, wherein said dynamically analyzing and said statically analyzing perform taint analysis of a memory space used by the computer program.

6. The computer-implemented method of claim 1, wherein the at least one possible security vulnerability relates to an execution path by the computer program between a first instruction for obtaining data from a data source and a second instruction for utilizing the data in a data sink, wherein the execution path does not comprise a third instruction performing a neutralizing operation.

7. The computer-implemented method of claim 6, wherein the neutralizing operation consists of at least one operation selected from the group consisting of: a sanitizing operation of the data; and a validation operation that uses the data.

8. The computer-implemented method of claim 1, wherein said dynamically analyzing comprises instrumenting the computer program with instructions operative to provide taint labels with respect to sections of a memory space, wherein the memory space is utilized by the computer program.

9. The computer-implemented method of claim 1, wherein the abstraction comprises unifying a set of memory locations into fragments of memory spaces, wherein each fragment is referred as an atomic unit, wherein the static analysis makes use of a different label for each atomic unit.

10. The computer-implemented method of claim 1 wherein said dynamic analyzing comprises at least one item selected from the group consisting of: executing the computer program; virtually executing the computer program in a virtual execution environment; and obtaining traces of execution of the computer program.

11. The computer-implemented method of claim 1, wherein the abstraction is an abstraction of the plurality of memory locations.

12. The computer-implemented method of claim 1, wherein the abstraction is a sound abstraction which does not render any security vulnerability existing in the computer program undetectable in the abstraction.

13. A computerized apparatus having a processor, the processor being adapted to perform the steps of:
receiving a computer program configured to use a plurality of memory locations;
dynamically analyzing the computer program to determine flow of untrusted data during execution of the computer program, wherein the flow of untrusted data is determined by tracking propagation of untrusted data between memory locations;
identifying at least one likely invariant of the computer program relating to trusted data or untrusted data being retained at a portion of the plurality of memory locations;
at least based on the at least one likely invariant, determining an abstraction of the computer program useful for statically analyzing whether the computer program is susceptible to at least one possible security vulnerability; and
performing static analysis of the abstraction, wherein the static analysis is for identifying whether the computer program is susceptible to at least one possible security vulnerability.

14. The computerized apparatus of claim 13, wherein the flow of untrusted data is indicated by a label for the memory locations, the label relating to the least one possible security vulnerability.

15. The computerized apparatus of claim 13, wherein said dynamically analyzing and said statically analyzing perform taint analysis of a memory space used by the computer program.

16. The computerized apparatus of claim 13, wherein the at least one possible security vulnerability relates to an execution path by the computer program between a first instruction for obtaining data from a data source and a second instruction for utilizing the data in a data sink, wherein the execution path does not comprise a third instruction performing a neutralizing operation.

17. The computerized apparatus of claim 13, wherein the abstraction comprises unifying a set of memory locations into fragments of memory spaces, wherein each fragment is referred as an atomic unit, wherein the static analysis makes use of a different label for each atomic unit.

18. The computerized apparatus of claim 13, wherein the abstraction is an abstraction of the plurality of memory locations.

19. The computerized apparatus of claim 13, wherein the abstraction is a sound abstraction which does not render any security vulnerability existing in the computer program undetectable in the abstraction.

20. A computer program product comprising a non-transitory computer readable medium retaining program instructions, which instructions when read by a processor, cause the processor to perform a method comprising:
receiving a computer program configured to use a plurality of memory locations;
dynamically analyzing the computer program to determine flow of untrusted data during execution of the computer program, wherein the flow of untrusted data is determined by tracking propagation of untrusted data between memory locations;
identifying at least one likely invariant of the computer program relating to trusted data or untrusted data being retained at a portion of the plurality of memory locations;
at least based on the at least one likely invariant, determining an abstraction of the computer program useful for statically analyzing whether the computer program is susceptible to at least one possible security vulnerability; and
performing static analysis of the abstraction, wherein the static analysis is for identifying whether the computer program is susceptible to at least one possible security vulnerability.

21. The computer program product of claim 20, wherein the abstraction is an abstraction of the plurality of memory locations.

* * * * *